Nov. 12, 1968   R. H. PREISER ET AL   3,410,140
HYGROMETER
Filed Aug. 17, 1967   3 Sheets-Sheet 1
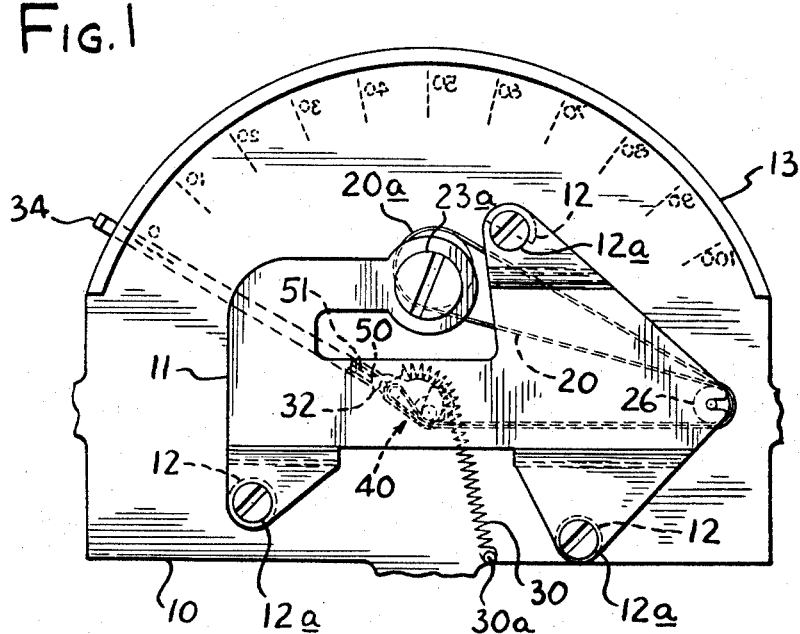
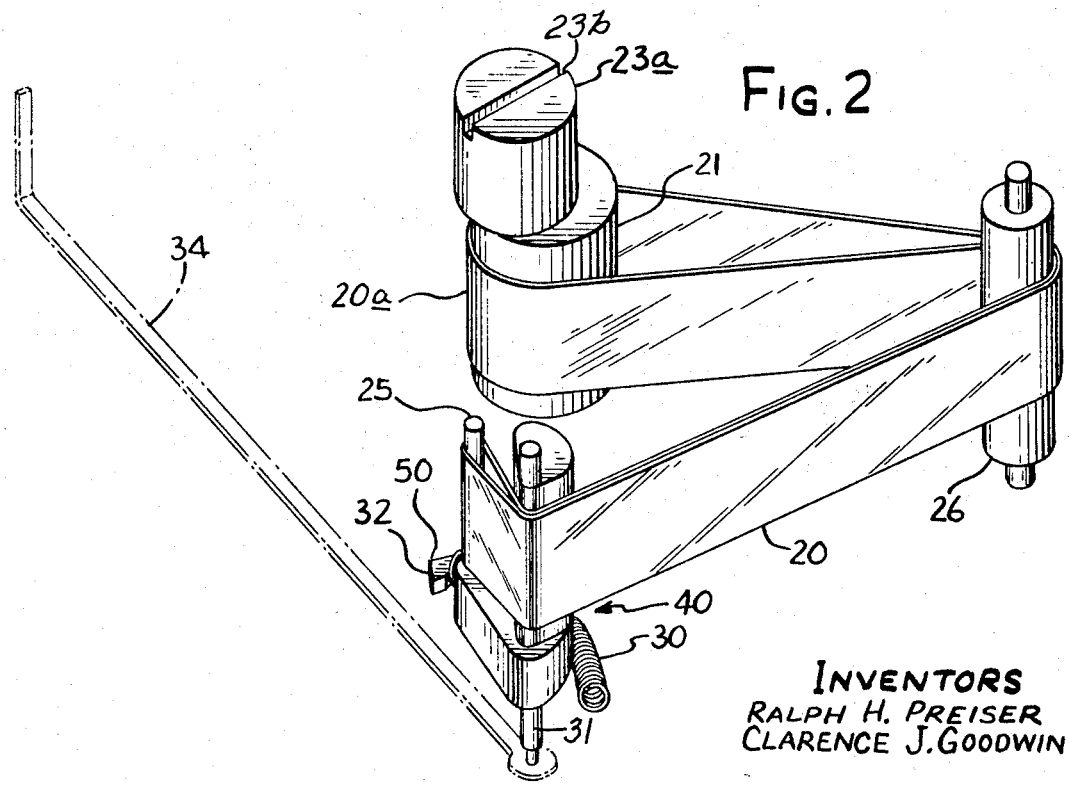
INVENTORS
RALPH H. PREISER
CLARENCE J. GOODWIN
by: Wolfe, Hubbard, Voit & Osann
ATTYS.

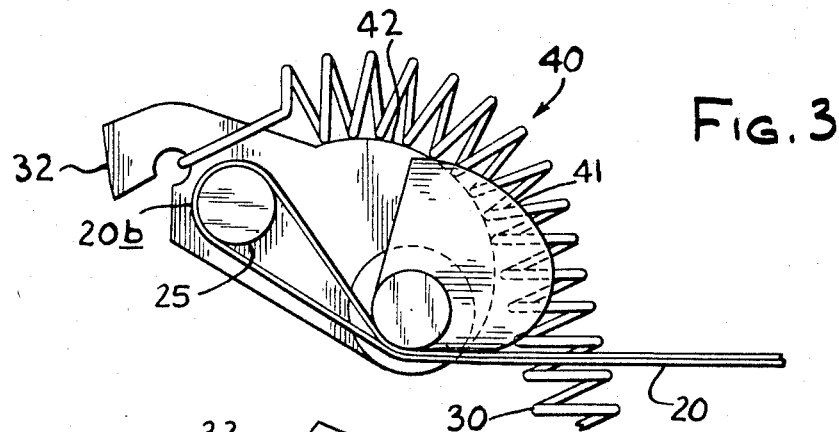
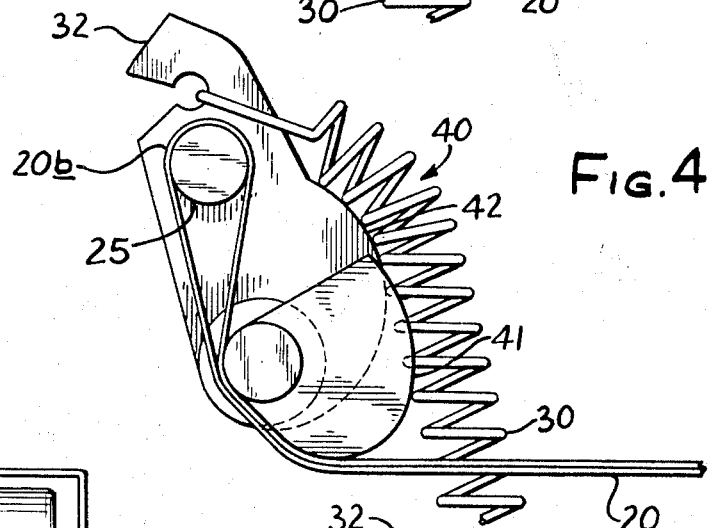
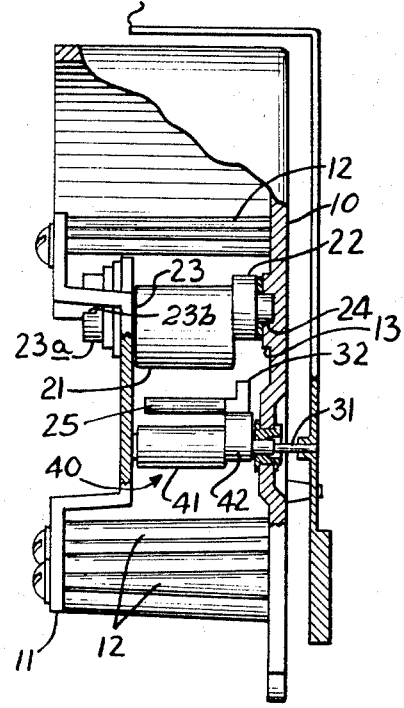
INVENTORS
RALPH H. PREISER
CLARENCE J. GOODWIN
by: Wolfe, Hubbard, Voit & Osann
ATTYS.

United States Patent Office 3,410,140
Patented Nov. 12, 1968

3,410,140
HYGROMETER
Ralph H. Preiser and Clarence J. Goodwin, La Salle, Ill., assignors to General Time Corporation, Stamford, Conn., a corporation of Delaware
Filed Aug. 17, 1967, Ser. No. 661,439
7 Claims. (Cl. 73—337.5)

ABSTRACT OF THE DISCLOSURE

A hygrometer having a humidity sensing element, typically made of nylon film, which changes in length as a non-linear function of the humidity to which it is exposed. A first end of the sensing element is adjustably fixed, while the other end is connected to an output assembly which includes a biasing means for tensioning the sensing element. The output assembly includes a compound cam having a first cam surface acting on the sensing element to continuously convert the non-linear variations in the length of the sensing element to linear displacement of the output assembly, and a second cam surface acting on the biasing means for continuously compensating for variations in the tensioning force so as to maintain a substantially constant tension on the sensing element. An eccentric cam is associated with the fixed end of the sensing element to permit adjustment thereof by manually turning the cam. The sensing element is shown as being in the form of a closed loop.

---

The present invention relates generally to hygrometers or humidity sensing devices and, more particularly, to an improved hygrometer of the type that provides a continuous direct indication of the relative humidity of the ambient atmosphere.

It is a primary object of this invention to provide an improved hygrometer which determines the relative humidity of the ambient atmosphere continuously and directly with a high degree of accuracy. A related object of the invention is to provide such a hygrometer in which a substantially constant tension is maintained on the humidity sensing element to improve the accuracy of the device, and which provides a mechanical output that varies linearly with the sensed relative humidity.

It is a further object of the present invention to provide an improved hygrometer of the type described above which can be manufactured simply and efficiently at a relatively low cost. In this connection, a still further object of the invention is to provide such a hygrometer which lends itself to high volume production with precise reproducibility and a high degree of reliablity.

Another object of this invention is to provide an improved hygrometer of the foregoing type which can be used either as an indicator or as a control unit for controlling humidification and/or dehumidification units.

Other objects and advantages of the invention will become apparent upon reading the following detailed description and upon reference to the drawings, in which:

FIG. 1 is a rear elevation of a hygrometer embodying the present invention, with outside casing removed to reveal the internal structure;

FIG. 2 is a perspective view of the humidity sensing and indicating mechanism in the hygrometer of FIGURE 1, with the supporting frame structure removed for clarity;

FIG. 3 is an enlarged rear elevation of the output assembly in the humidity sensing and indicating mechanism in the hygrometer of FIGURE 1;

FIG. 4 is a rear elevation of the same structure shown in FIGURE 3 but displaced 45° from the position in FIGURE 3 so as to represent a different humidity level;

FIG. 5 is a rear elevation of the same structure shown in FIGURE 3 but displaced 90° from the position in FIGURE 3 so as to represent a different humidity level;

FIG. 8 is an end view, partially in section, of the hygrometer of FIGURE 1.

Figure 7:
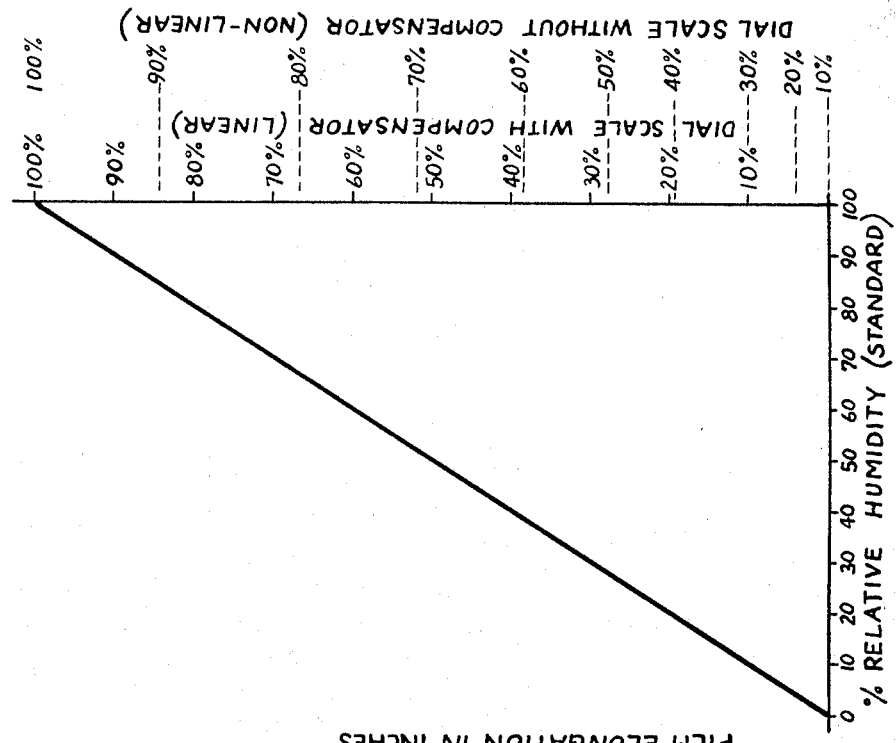
FIG. 7 is a graph showing calibrated relative humidity scales for a hygrometer utilizing the sensing element of FIGURE 6, both with and without the present invention, as a function of actual relative humidity.

While the invention will be described in connection with certain preferred embodiments, it will be understood that it is not intended to limit the invention to these particular embodiments. On the contrary, it is intended to cover all alternatives, modifications, and equivalents as may be included within the spirit and scope of the invention as defined by the appended claims.

Turning now to the drawings and referring first to FIGURE 1, there is shown the humidity sensing and indicating mechanism of a hygrometer with its casing removed. The sensing and control elements are mounted between a pair of frame plates 10 and 11 which are held in fixed spaced apart relationship by a plurality of spacer posts 12 formed as integral parts of the forward plate 10 and receiving screws 12a threaded into the posts from the back side of the rear plate 11. The forward frame plate 10 is adapted to fit within the casing that is not shown, with the front side of the plate 10 serving as the display surface of the instrument. A numerical scale may be provided on the front side of the plate 10, as indicated in broken lines in FIGURE 1, for cooperation with a mechanical pointer described below for indicating the relative humidity sensed by the instrument.

A moisture responsive sensing element 20 is disposed between the two frame plates 10 and 11 and is fixed at one end 20a to a regulating cam 21. To permit manual regulation of the fixed end 20a of the sensing element, in accordance with one aspect of the present invention, the opposite ends of the cam 21 are eccentrically connected to a pair of rotatable elements 22 and 23. The forward element 22 includes a stub shaft 24 journaled in a complementally formed boss 13 on the rear side of the forward frame plate 10. The rear element 23 is in the form of a stub shaft which is journaled in the rear frame plate 11 and extends therethrough for connection with a regulating stud 23a projecting from the rear side of the plate 11. Both the stub shaft 24 and the element 23 are fitted snugly within the mounting portions of the two frame plates 10 and 11 so that the regulating cam 21 is held firmly in place by friction, and yet the cam 21 can be rotated by manual adjustment of the stud 23a to adjust the fixed end 20a of the sensing element 20. To facilitate manual adjustment of the stud 23a, a slot 23b is formed in the exposed end surface thereof so as to be accessible from the rear of the instrument. The eccentric rotation of the cam 21 has the effect of limiting the range of the adjustment of the fixed end 20a of the sensing element, so that it is not possible for the operator to accidently stretch the sensing element beyond its yield point. It will be appreciated that the entire regulating assembly including the cam 21, the two rotatable elements 22, 23 and the stub shaft 24, can be formed as a single integral unit which can be conveniently made of molded plastic for example.

Figure 6:
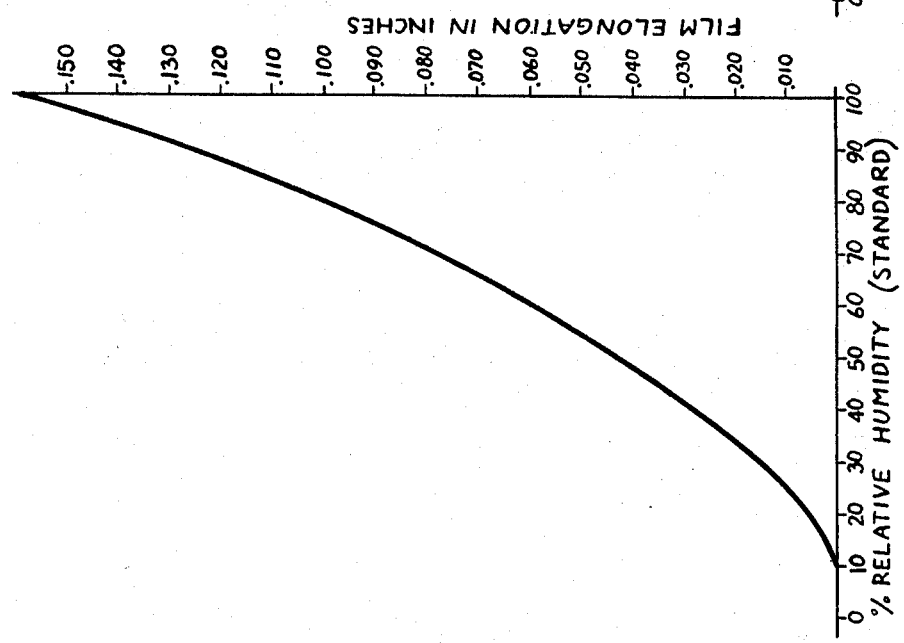
FIG. 6 is a graph showing the variation in length of the sensing element in the hygrometer of FIGURE 1 as a function of the relative humidity.

The sensing element 20 in the illustrative hygrometer may be made of any of a number of different materials which change in length as a non-linear function of the humidity in the ambient air. The preferred material for the sensing element is commonly known as nylon-6, which is a condensation product of 1, 6-hexanediamine and adipic acid. The longitudinal growth characteristic of a six-inch strip of nylon-6 film as a function of relative humidity is illustrated in FIGURE 6, and will be discussed in more detail below.

In the particular embodiment illustrated, the moisture responsive sensing element 20 is in the form of a closed loop of film, one end of which is looped around an adjustable fixed point, while the other end is secured to a movable output assembly. Thus, in the illustrative embodiment, the sensing element 20 is in the form of a closed loop of nylon-6 film having a fixed end 20a formed by looping around the regulating cam 21, and a movable end 20b looped around a pin 25 included in the output assembly of the hygrometer. It will be appreciated that the closed loop construction of the sensing element not only facilitates assembly of the instrument, but is also more accurate because it eliminates the possibility of varying the two end points during manufacture of the instrument, such as might occur when the two end points are determined by clamping two free ends of a sensing element. The mid-portion of the sensing film is doubled around an idler roller 26 journaled between the two frame plates 10, 11 at a point spaced away from the two end points 20a and 20b so that the overall configuration of the sensing film 20 is generally V-shaped (see FIGS. 1 and 2). This enables the sensing element to be accommodated in a structure considerably shorter than the length of the film strip. If desired, additional idler rollers could be provided, to form an S-shaped film path for example, but it is desired to keep the frictional load imposed on the sensing film by such rollers to a minimum.

As the humidity in the ambient air increases, the length of the sensing film 20 also increases so as to permit advancing movement of the output assembly which carries the film pin 25. In the illustrative embodiment, such advancing movement is effected by a biasing spring 30 which not only advances the output assembly in response to elongations of the sensing film 20, but also maintains the film 20 under tension at all times. Thus, the coiled biasing spring 30 is fixed at one end to an integral pin 30a on the forward frame plate 10 (FIG. 1), while the other end of the spring is hooked over a lug 32 formed as an integral part of the output assembly adjacent the film pin 25 which holds the movable end of the sensing element. Both the pin 25 and lug 32 are spaced a substantial distance away from the axis of the output shaft 31 of the output assembly. The spring 30 thus urges the output assembly in a clockwise direction (as viewed in FIGS. 1 and 2) so as to tension the sensing film 20, with the tensioning force applied by the spring 30 varying as the spring expands and contracts due to movement of the output assembly in response to changes in the length of the sensing element. More particularly, the tensioning force increases when the spring is expanded by counterclockwise movement of the output assembly, and the tensioning force decreases when the spring contracts due to clockwise movement of the output assembly.

As the sensing film 20 elongates in response to increasing humidity, the biasing spring 30 rotates the output assembly and the output shaft 31 fixed thereto, in a clockwise direction (as viewed in FIGS. 1 and 2) while continuously maintaining the sensing film under tension. Conversely, when the sensing film 20 shrinks in response to decreasing humidity, the film rotates the output assembly and the shaft 31 against the bias of the spring 30 in a counterclockwise direction (as viewed in FIGS. 1 and 2), while the spring 30 still maintains the film 20 under tension.

In order to provide a visible indication of the angular movement of the output assembly due to variationn in the length of the sensing film, a pointer 34 is mounted on the forward end of the output shaft 31 on the front side of the display plate 11. This pointer 34 cooperates with the scale indicated in broken lines (FIGURE 1) on the front of the plate 11 so as to provide a continuous direct reading of the relative humidity sensed by the film 20.

In accordance with the present invention, the hygrometer output assembly includes a compound cam connected to the output shaft for movement therewith, the compound cam having a first cam surface cooperating with the sensing element to automatically and continuously convert the nonlinear virations in the length of the sensing element to linear displacement of the output shaft, and a second cam surface cooperating with the biasing spring to automatically and continuously maintain a substantially constant tension on the sensing element. Thus, in the illustrative embodiment a compound cam 40 is mounted on the output shaft 31 and forms a first cam surface 41 which acts directly on the sensing film 20 to provide an output displacement which varies as a linear function of variations in the relative humidity. In other words, the compensating cam surface 41 continually responds to displacement of the output assembly to act directly on the sensing element so as to compensate for the non-linear elongation and shrinkage characteristic of the sensing element 20 to provide a linear output characteristic, thereby permitting the use of a linearly calibrated scale on the dial where the relative humidity readings are made.

In order to maintain a substantially constant tension on the sensing film 20, regardless of the position of the output assembly, the compound cam 40 forms a second cam surface 42 which acts directly on the biasing spring 30 so as to automatically change the effective moment arm of the tensioning force in response to displacements of the output assembly. Thus, the cam surface 42 effectively compensates for variations in the tensioning force due to expansion and contraction of the biasing spring 30 as the anchoring lug 32 is displaced angularly about the axis of the shaft 31. Since the tension on the sensing film 20 is maintained substantially constant by the automatic compensating action of the cam surface 42, the elongation and shrinkage characteristics of the sensing film 20 accurately reflect variations in the relative humidity of the ambient atmosphere, i.e., the characteristics are not distorted by variations in the tension applied to the film.

To facilitate an understanding of the present invention, the operation of the compound cam 40 will be described in more detail by referring to the sequential views in FIGS. 3 through 5 illustrating the position of the compound cam at three different relative humidities. Turning first to the operation of the cam surface 41, this portion of the compound cam is responsive to angular displacement of the output assembly for acting directly on the sensing film 20 to cam the film away from the center of the output assembly as the length of the film increases with increasing humidity and, conversely, to permit the sensing film to retract toward the center of the output assembly as the length of the film decreases with decreasing humidity. Thus, the cam surface 41 effectively widens the V formed by the sensing film 20 as the humidity increases, and narrows the V as the humiidty decreases. Consequently, it can be seen that the cam surface 41 has the effect of increasing the distance which must be spanned by the film between the idler roller 26 and the zero position of the film pin 25 as the film is elongated, so that only a portion of the total elongation is converted into angular displacement of the output assembly. The exact percentage of the film elongation that is converted into angular displacement of the output assembly at any given film length is determined by the shape of the cam surface 41, which is designed to compensate for the non-linearity in the film elongation characteristic.

The compensating effect of the cam surface 41 will be more clearly understood by reference to FIGURES 6 and 7. FIG. 6 is a graph showing the variation in length of a six-inch length (3 inches between ends of closed loop) of nylon-6 film, 0.25 inch wide by 0.001 inch thick, as a function of the relative humidity causing the changes in film length. It can be seen that the film has a definite nonlinear characteristic, i.e., the film length does not vary in direct proportion to the variations in relative humidity. More particularly, the film becomes increasingly responsive to changes in humidity as the relative humidity increases from 0 to 100, and vice versa.

The effect of the compensating cam surface 41 is illustrated in FIG. 7, which is a graph showing the calibrated scales required on the dial of a hygrometer utilizing a sensing element having the characteristic illustrated in FIG. 6, with and without the compensating cam. Thus, the right-hand scale along the vertical axis in FIG. 7 is the scale required without the compensating cam, i.e., where the displacement of the output assembly varies in direct proportion to the variations in film length; it can be seen that this scale is non-linear, because of the non-linear elongation characteristic of the sensing film, and is much more confusing to read than a linearly calibrated scale. With the addition of the compensating cam surface 41, the left-hand scale along the vertical axis in FIG. 7 can be used; this is a linear scale because the compensation effected by the cam 41 provides an output displacement which varies in direct proportion to the variations in relative humidity, as indicated by the straight-line output characteristic in FIG. 7. The linear scale is, of course, much easier to read than the non-linear scale required without the compensator.

Returning now to FIGURES 3 through 5, the second cam surface 42 is responsive to angular displacement of the output assembly for acting directly on the biasing spring 30 to progressively increase the moment arm of the tensioning force as the length of the sensing film 20 increases with increasing humidity and, conversely, to progressively reduce the moment arm of the tensioning force as the length of the film 20 decreases with decreasing humidity. Thus, the moment arm of the tensioning force is automatically reduced whenever the tensioning force is increased due to expansion of the spring 30 when the film 20 shrinks, and the moment arm is increased whenever the tensioning force is reduced due to contraction of the spring 30 when the sensing film 20 elongates. Referring to FIGURE 3, for example, it can be seen that the effective moment arm of the tensioning force applied by the spring 30 is relatively short because the cam surface 42 permits the spring to lie fairly close to the output shaft 31. When the sensing film 20 elongates to permit the output assembly to be rotated to the position shown in FIGURE 4, the spring 30 contracts to reduce the tensioning force, but at the same time the angular displacement of the cam surface 42 increases the effective moment arm by camming the spring 30 farther away from the output shaft 31. As a result, the tensioning force actually applied to the sensing film 20 is substantially the same as that in FIGURE 3. When further elongation of the sensing film 20 permits the output assembly to be displaced to the position illustrated in FIGURE 5, the spring 30 contracts to further reduce the tensioning force, but the cam surface 42 further increases the effective moment arm so that again the resultant tensioning force applied to the sensing film 20 is maintained substantially constant.

Consequently, it can be seen that the cam surface 42 has the effect of maintaining a substantially constant torque (the tensioning force actually applied to the sensing film 20) by varying the moment arm inversely with respect to variations in the magnitude of the tensioning force exerted by the spring 30, so that the actual tension applied to the sensing film 20 remains essentially constant. The exact rate at which the moment arm is varied is determined by the shape of the cam surface 42, which in turn is designed to exactly compensate for the variations in the tensioning force exerted by the biasing spring 30 over the range covered by the compound cam.

It will be appreciated that the single compound cam 40 compensates for both the non-linear characteristic of the sensing film 20 and the variable tensioning force caused by expansion and contraction of the biasing spring 30. It has been found that this single compound cam is capable of providing precise compensation for both variables so as to provide an output which is a highly accurate indication of the sensed relative humidity, and yet the cam can be efficiently manufactured at an extremely low cost. For example, the cam can be molded from a low cost plastic with a high degree of reproducibility and reliability. In operation, the compound cam is extremely durable with a virtually unlimited operating life. As mentioned previously, the pin 25 and the lug 32 which are used to anchor the sensing film 20 and the biasing spring 30, respectively, may conveniently be formed as integral parts of the compound cam so that the entire output assembly of the hygrometer can be quickly and accurately assembled by simply placing the compound cam unit on the output shaft 30, and then connecting the biasing spring 30 thereto.

In the illustrative hygrometer described thus far, the output assembly, comprising the compound cam unit, the output shaft 31, and the biasing spring 30 is designed to provide an output displacement of 120° over the full 0 to 100% range of relative humidity, i.e., the pointer 34 swings through an arc of 120° between 0 and 100% relative humidity. A significant feature of this invention is that the output displacement may be readily changed by making only a minor modification in the output assembly. For example, the 120° displacement provided by the illustrative unit may be increased or decreased by simply connecting a pair of gears between the output shaft 31 and the shaft of the pointer 34, with an appropriate gear ratio to provide the desired increase or decrease in the displacement of the pointer 34. Alternatively, different output displacements can be achieved by simply substituting different compound cams 40 designed to provide different total angular displacements of the output assembly while still effecting the desired compensation. In this connection, it should be noted that if the angular displacement of the output assembly is increased to the point where the film pins 25 is rotated so far that it comes into contact with the main body portion of the film 20, the pin 25 may itself form a part of the compensating cam surface 41. It will be apparent that a wide variety of different camming devices may be utilized to effect the desired compensation in accordance with the teachings of this invention.

As a further feature of this invention, means are provided for initially locating the compound cam 40 and the pointer 34 at precise predetermined positions during the assembling operation. Thus, in the illustrative instrument, the lug 32 is provided with a sharp corner 50 which registers with a fixed registration mark 51 on the front frame plate 10 when the output assembly is in the zero position. During assembly of the unit, the output assembly is rotated until the corner 50 is aligned with the registration mark 51 and the pointer 34 is then staked to the shaft 31 in alignment with the zero on the scale on the front of the plate 10. After the assembly has been completed, the regulating cam 21 is adjust to locate the pointer 34 at the correct humidity reading for the ambient atmosphere. This feature assures accurate reproducibility of the hygrometers regardless of the production volume.

As can be seen from the foregoing detailed description, the present invention provides an improved hygrometer which provides a continuous and accurate indication of relative humidity on a linearly calibrated scale by the use of a single compound cam. One cam surface acts directly on a sensing element that varies as a non-linear functin of humidity, and continually responds to displacement of the output assembly to continuously and automatically compensate for the non-linear characteristic of the sensing element by acting directly on the sensing element. A second cam surface acts directly on the biasing spring to maintain a substantially constant tension on the sensing element so that the elongation and shrinkage characteristic is not distorted by variations in the tensioning force. Consequently, the improved hygrometer provided by this invention achieves significantly improved accuracy and reliability by the use of a single compensating member which

We claim as our invention:

1. An improved hygrometer comprising the combination of a humidity sensing element made of a material which changes in length as a non-linear function of the humidity to which it is exposed, means connected to a first point on said sensing element for holding said first point in a fixed position, tensioning means connected to a second point on said sensing element spaced longitudinally away from said first point for permitting movement of said second point in response to changes in the length of said sensing element while maintaining the sensing element under tension, the tensioning force exerted by said tensioning means varying in accordance with changes in the length of said sensing element, output means adapted to be displaced in response to movement of said second point to indicate changes in the humidity by said element, and a compound can operatively associated with said output means, said tensioning means, and said sensing element for automatically responding to displacement of said output means to continuously compensate for variations in said tensioning force to maintain a substantially constant tension on said sensing element, and to continuously convert the non-linear variations in the length of said sensing element to linear displacement of said output means.

2. An improved hygrometer as defined in claim 1 in which said tensioning means is a coiled spring having one end fixed and the other end operatively connected to said second point on said sensing element via said compound cam, with the tensioning force exerted by said spring varying due to expansion and contraction of said spring in response to changes in the length of said sensing element and the resultant displacement of said output means and said compound cam.

3. An improved hygrometer as defined in claim 1 in which said humidity sensing element is a closed loop of moisture sensitive film which changes in length as a function of the humidity to which it is exposed.

4. An improved hygrometer as defined in claim 1 which includes a regulating cam operatively associated with said sensing element and mounted for eccentric rotation for adjusting the fixed position of said first point on said sensing element, the eccentric rotation of said regulating cam limiting the range of adjustment of said fixed position to prevent the stretching of said sensing element beyond its yield point.

5. An improved hygrometer comprising the combination of a humidity sensing element made of a material which changes in length as a non-linear function of the humidity to which it is exposed, means connected to first end of said sensing element for holding said first end in a fixed position, output means operatively connected to the other end of said sensing element and adapted to be displaced in response to movement of said other end to indicate changes in the humidity sensed by said element, a tensioning spring having one end fixed and the other end operatively connected to said output means for tensioning said sensing element with the tensioning force varying in accordance with changes in the effective length of said spring due to movement of said output means, and a compound cam connected to said output means for movement therewith, said compound cam having a first cam surface in direct engagement with said sensing element and responsive to displacement of said output means to convert the non-linear variations in the length of said sensing element to linear displacement of said output means, and a second cam surface in direct engagement with said tensioning spring for automatically changing the effective moment arm of the tensioning force in response to displacement of said output means to maintain a substantially constant tensioning force on said sensing element.

6. An improved hygrometer comprising the combination of a humidity sensing element made of a material which changes in length as a function of the humidity to which it is exposed, means connected to a first point on said sensing element for holding said first point in a fixed position, tensioning means connected to a second point on said sensing element spaced longitudinally away from said first point for permitting movement of said second point in response to changes in the length of said sensing element while maintaining the sensing element under tension, output means adapted to be displaced in response to movement of said second point to indicate changes in the humidity sensed by said element, and a compensating cam in direct engagement with said tensioning means and operatively associated with said output means for responding to displacement of said output means to compensate for variations in tensioning force exerted by said tensioning means so as to maintain a substantially constant tension on said sensing element.

7. An improved hygrometer comprising the combination of a humidity sensing element made of a material which changes in length as a function of the humidity to which it is exposed, first mounting means adapted to hold one end of said sensing element in a fixed position, a regulation cam connected to said first mounting means and mounted for eccentric rotation for adjusting the position of said first mounting means and thereby adjusting the fixed position of said one end of said sensing element, the eccentric rotation of said cam limiting the range of adjustment of said fixed end of said sensing element to prevent the stretching of said element beyond its yield point, and output means including a second mounting means for holding the other end of said sensing element under tension while permitting movement thereof in responsive to variations in the length of said sensing element for indicating the reative humidity.

References Cited

UNITED STATES PATENTS 2,781,664    2/1957    Ogden _____ 73—337.5

S. CLEMENT SWISHER, *Acting Primary Examiner.*

D. E. CORR, *Assistant Examiner.*